June 16, 1925.  1,542,207
G. S. BARKER
VULCANIZING MACHINE
Filed Dec. 17, 1923
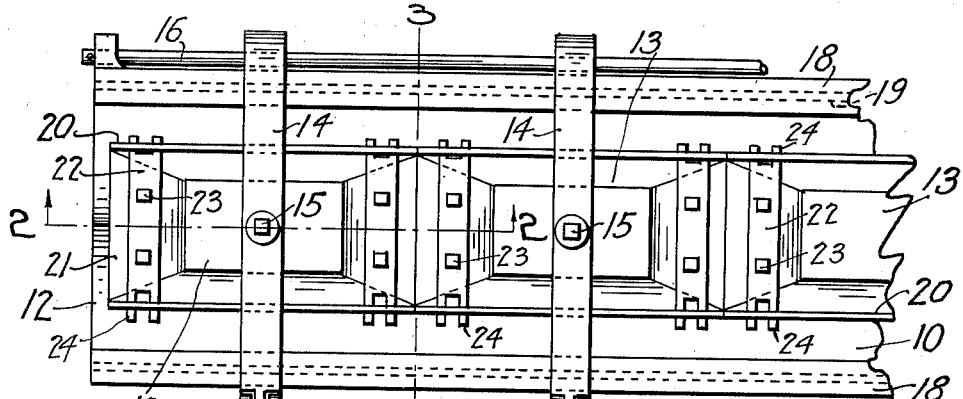
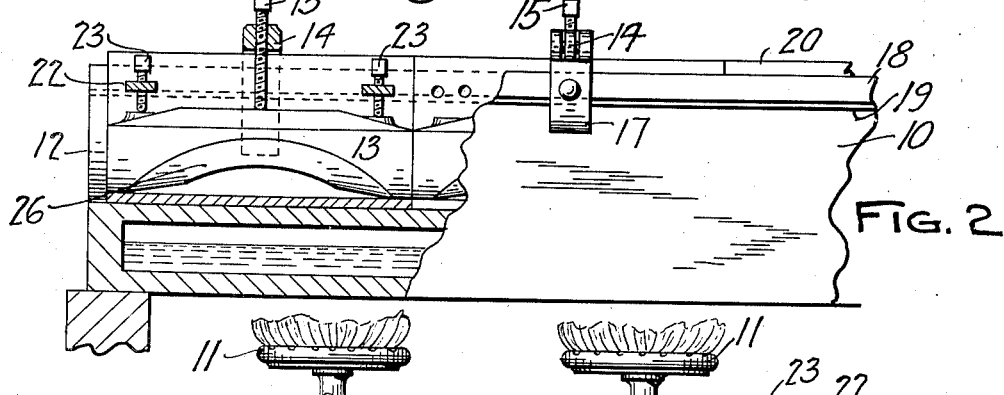
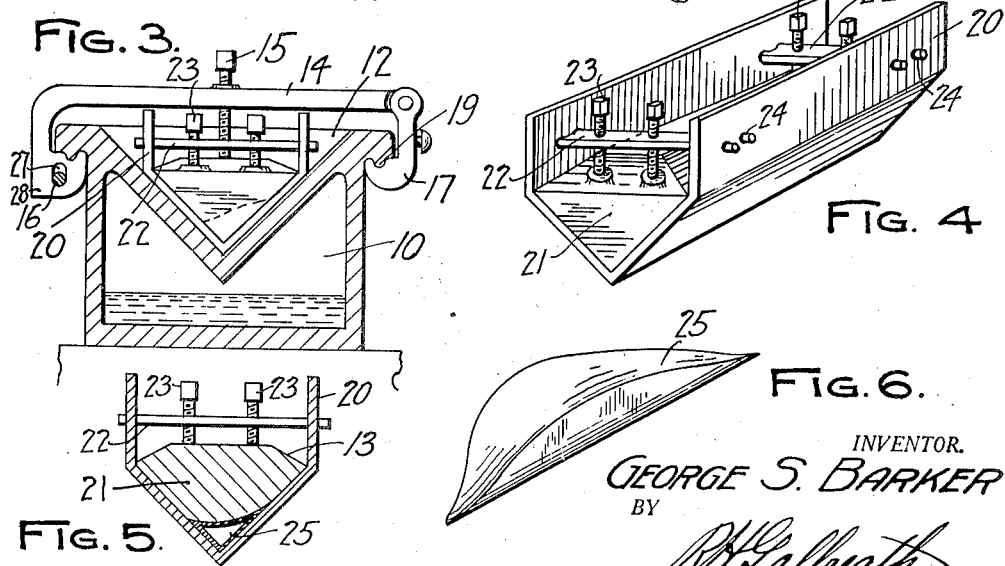
INVENTOR.
GEORGE S. BARKER
BY
ATTORNEY.

Patented June 16, 1925.

1,542,207

UNITED STATES PATENT OFFICE.

GEORGE S. BARKER, OF DENVER, COLORADO.

VULCANIZING MACHINE.

Application filed December 17, 1923. Serial No. 681,265.

*To all whom it may concern:*

Be it known that I, GEORGE S. BARKER, a citizen of the United States of America, residing at Denver, in the county of Denver and State of Colorado, have invented certain new and useful Improvements in Vulcanizing Machines, of which the following is a specification.

This invention relates to improvements in vulcanizers more especially of the type used for curing completely closed hollow rubber articles and while the form illustrated and described is more particularly applicable to the curing of hollow rubber cores for pneumatic arch supports, the invention may be readily adapted, by changing the form of the mold, for use in curing any article of similar nature.

The principal object of the invention is to provide a device of this character in which the curing molds may be quickly and easily removed from the device without disturbing the article being cured and without relieving the pressure thereon.

A further object resides in the construction of the curing mold whereby it may be quickly opened and closed for the replacement of the articles being manufactured.

A still further object is to provide a vulcanizer which is readily adaptable to varying sizes of curing molds.

Other objects and advantages reside in the detail construction of the invention, which result in simplicity, economy and efficiency, and which will become more apparent from the following description.

In the following detailed description of the invention reference is had to the accompanying drawings which form a part hereof. Like numerals refer to like parts in all views of the drawing and throughout the description.

In the drawing:

Figure 1 is a plan view of a portion of the improved vulcanizer, showing the curing molds in place.

Fig. 2 is a side elevation of the same, partly broken away. The section in this view is taken on the line 2—2, Fig. 1.

Fig. 3 is a cross sectional view taken on the line 3—3, Fig. 1.

Fig. 4 is a perspective view of the curing mold.

Fig. 5 is a vertical cross section through the curing mold.

Fig. 6 is a perspective view of a hollow pneumatic arch support core for the curing of which the particular form of curing mold illustrated is adopted.

Let the numeral 10 designate a steam tight container or boiler containing water which is converted into steam by means of any suitable burners 11. The boiler 10 could of course, be connected to source of live steam and the burners 11 eliminated if desired. Boiler 10 is supported on any suitable supports.

In the upper side of the boiler 10 is a large V shaped groove 12 running throughout the length of the boiler.

Curing molds, designated in their entirety by the numeral 13, are placed in the groove 12 and clamped therein by means of clamps 14 and clamp screws 15. The clamps 14 are hinged at their one extremity on a longitudinal bar 16, which runs throughout the length of the boiler 10, and are provided at their other extremity with a hinged hook-shaped catch 17.

The boiler 10 is provided along its upper edge at each side with flanges 18, along the under surface of each of which is a longitudinal bead 19, with which the clamps 14 and their catches 17 engage. The beads 19 prevent the clamps and catches from slipping off the flanges.

The molds 13 comprise an outer V shaped shell 20, of the proper angle to fit accurately in the groove 12 of the boiler 10, and a mold block 21 of the proper size and shape to fit accurately within the shell 20. The mold blocks 21 are secured in and clamped to the shells 20 by means of detachable cross bars 22 in which are threaded clamp screws 23. Each of the extremities of the bars 22 are provided with two prongs 24 which engage in openings formed in the shell 20, as illustrated. The prongs 24 at one extremity of the bars 22 are longer than those at the other extremity. This allows the bars 22 to be moved in the shell in the direction of the long prongs until the shorter prongs have disengaged the shell, when the bars may be removed entirely from the shell.

I will now describe the process of using my improved vulcanizer for the curing of hollow rubber cores for pneumatic arch supports, one of which is illustrated in Fig. 6, designated by the numeral 25.

The core is formed of raw rubber in approximately its final shape. Two sides of this particular core are at right angles to each other and the core is placed in the shell with these two sides against the shell as illustrated in Fig. 5. The mold blocks have cavities 26, conforming to the shape of the article being cured. The blocks 21 are now placed over the article 25, the bars 22 put in place and the clamp screws 23 tightly set.

The molds are now set into the groove 12 of the boiler and clamped tightly therein by means of the clamps 14 and the clamp screws 15.

A small quantity of water is placed in the interior of the raw rubber article before it is finally sealed. The heat from the boiler converts this water into steam and creates an internal pressure in the article while it is being cured. This pressure forces the rubber tightly against the interior of the mold and if the mold blocks 21 were removed before the article had cooled this pressure would explode the article. For this reason I have constructed the device so that the curing molds may be removed from the boiler, without releasing the pressure in the article, and laid aside to cool while they are being replaced by other curing molds containing raw articles.

The boilers 10 are made of considerable length so that their operation is practically continuous. When the curing molds have been placed in position throughout the length of the boiler, the operator can then start at the first end and replace the molds with fresh ones.

As the clamp screws 15 are loosened the clamps 14 will move away from the bead 19, owing to the rod being carried in slotted hole 27 in the clamp, and allow the clamps to be thrown back for the easy removal of the curing molds. The catch 17 will also move away from its bead 19 so that it may be swung to release the clamp. The clamps 14 may be moved longitudinally to accommodate various lengths of curing molds. A projection 28 is provided on the clamps 14 to engage the side of the boiler and hold the clamps in the vertical or open position.

While I have herein illustrated and described in some detail one form of my invention, it is understood that the invention is not to be regarded limited to the precise construction described, except in so far as such limitations are included within the terms of the accompanying claims, in which it is my intention to claim all novelty inherent in my invention as broadly as is permissible in view of the prior art.

Having thus described the invention, what I claim and desire to secure by Letters Patent is:—

1. A vulcanizing machine comprising a heat-containing unit and curing molds arranged to be clamped against said heat-containing unit, said curing molds comprising sections arranged to be clamped together around the article to be cured before said molds are clamped against said heat-containing unit.

2. In a vulcanizing machine comprising a heating unit carrying mold-attaching clamps, sectional curing molds arranged to be clamped to said heating unit by means of said mold-attaching clamps said curing molds being integrally clamped together independently of said mold-attaching clamps.

3. A vulcanizing machine comprising a heating unit provided with a longitudinal V-shaped groove; a similarly shaped shell arranged to rest within said groove; a similarly shaped indented mold block arranged to rest within said shell, said shell and the indented portion of said mold block forming the mold for the article to be molded; clamps for securing said mold block to said shell and other clamps for securing the clamped together mold block and shell to said heating unit.

4. In a vulcanizing machine the combination with a heat-containing unit of detachable curing molds comprising a shell; a mold block and means on said shell for clamping said shell and said mold block together around the article to be cured.

5. In a vulcanizing machine the combination with a heat-containing unit of detachable curing molds comprising a shell; a mold block and means for clamping said shell and said mold block together around the article to be cured, said means comprising cross bars detachably engaging said shell over said mold block and clamp screws carried by said bars and engaging said mold block.

6. A vulcanizing machine comprising a boiler having a longitudinal groove in its top; a detachable clamp spanning said groove; sectional curing molds shaped to fit said groove, said molds being secured in said groove by said clamp and other clamps on said curing molds for clamping same together apart from said boiler.

In testimony whereof, I affix my signature.

GEORGE S. BARKER.